(12) United States Patent
Kershman et al.

(10) Patent No.: US 6,623,778 B2
(45) Date of Patent: Sep. 23, 2003

(54) METHOD FOR PRESSURE BAKING INCLUDING A FILLING ENCAPSULANT SYSTEM

(75) Inventors: Alvin Kershman, Paradise Valley, MO (US); Jeff L. Shear, Chesterfield, MO (US)

(73) Assignee: SMTM Group LLC, Chesterfeild, MO (US)

( * ) Notice: Subject to any disclaimer, the term of this patent is extended or adjusted under 35 U.S.C. 154(b) by 0 days.

(21) Appl. No.: 10/098,027

(22) Filed: Mar. 14, 2002

(65) Prior Publication Data

US 2002/0094366 A1 Jul. 18, 2002

Related U.S. Application Data

(62) Division of application No. 09/537,056, filed on Mar. 28, 2000, now Pat. No. 6,399,125, which is a continuation-in-part of application No. 09/458,378, filed on Dec. 10, 1999, now abandoned, which is a division of application No. 08/950,984, filed on Oct. 15, 1997, now Pat. No. 6,258,395.

(51) Int. Cl.⁷ .............................................. A21D 10/04
(52) U.S. Cl. ........................ 426/552; 426/94; 426/496; 426/505; 426/523
(58) Field of Search .......................... 426/94, 274, 275, 426/297, 496, 552, 505, 523; 99/450.7

(56) References Cited

U.S. PATENT DOCUMENTS 3,551,161 A    12/1970   Whitestone 6,013,300 A    1/2000   Reichkitzer et al. ........ 426/496

FOREIGN PATENT DOCUMENTS

| DE | 19736608 | 8/1998 |
|---|---|---|
| DE | 19842606 | 3/2000 |
| EP | 0030578 | 6/1981 |
| EP | 0421509 | 4/1991 |
| EP | 0893061 | 1/1999 |
| FR | 2602399 | 2/1988 |
| WO | WO 9736505 | 10/1997 |

Primary Examiner—George C. Yeung
(74) Attorney, Agent, or Firm—Michael Pritzkau

(57) ABSTRACT

A baked food product is described including a filling surrounded by a baked layer. An edible encapsulant layer surrounds the filling and is disposed between the filling and the baked layer. The encapsulant layer may be formed of a protein encapsulated starch and serves to maintain separation between the filling and the surrounding baked layer during initial baking and during subsequent storage and re-heating, even in cases of a liquid type filling. A baking method is described in which a baking mixture is prepared including at least one leavening agent provided in a predetermined amount. The baking mixture is then baked in a way which limits expansion of the baking mixture to establish a baked density of the baked product and such that the predetermined amount of the leavening agent is sufficient to limit the time required for baking the baked comestible. The predetermined amount of leavening agent may also serve in forming an enhanced thin crust surrounding the baked product. The enhanced thin crust is particularly useful in a baked product including the described encapsulant layer containing a filling, since toaster stable products suited for refrigerable storage are readily produced.

14 Claims, 5 Drawing Sheets

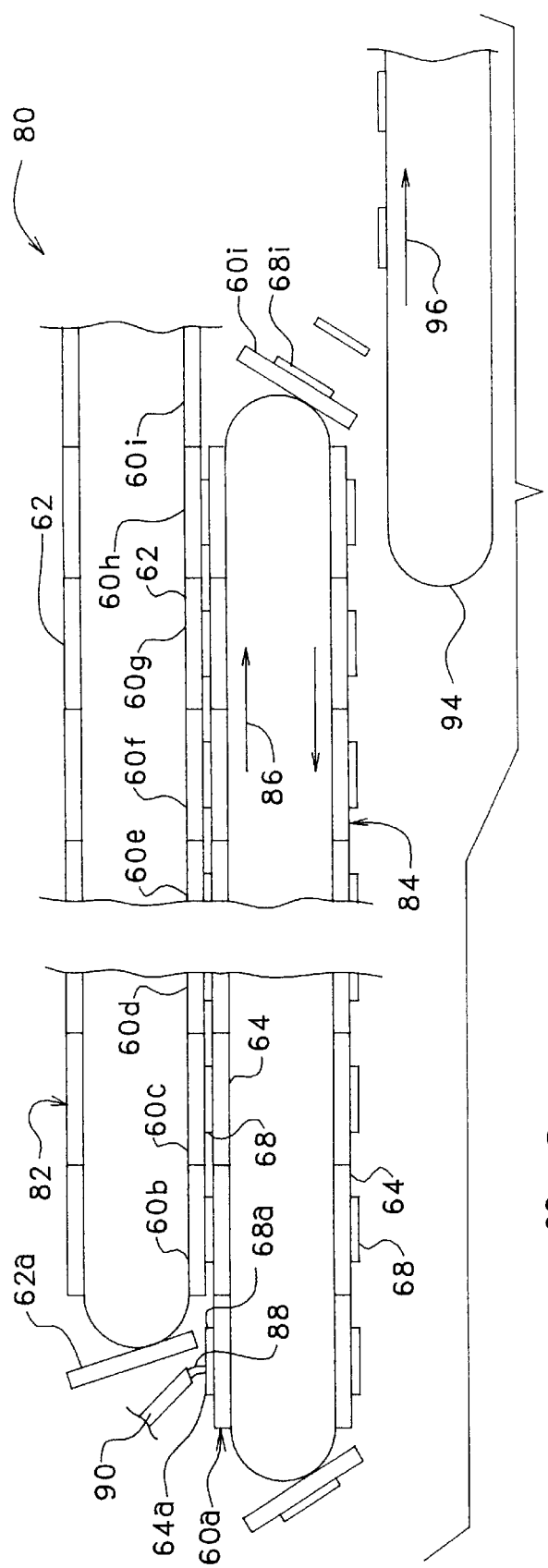
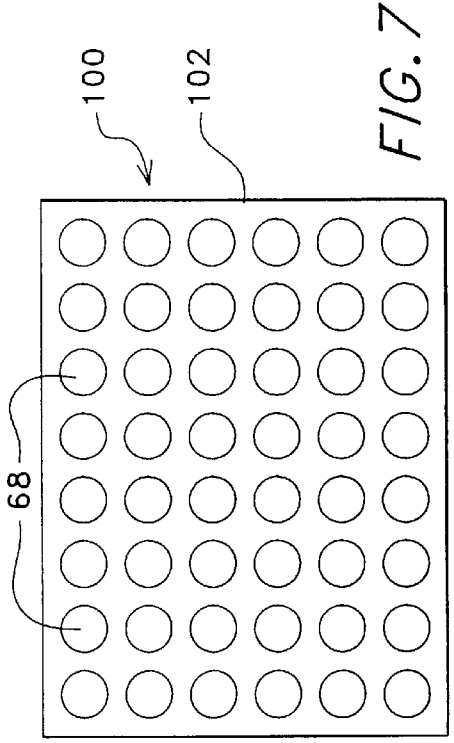

METHOD FOR PRESSURE BAKING INCLUDING A FILLING ENCAPSULANT SYSTEM

RELATED APPLICATIONS

This application is a Divisional application of prior application Ser. No. 09/537,056 filed on Mar. 28, 2000 now U.S. Pat. No. 6,399,125B1, which is a continuation-in-part application of prior application Ser. No. 09/458,378 filed on Dec. 10, 1999, now abandoned, which is a divisional of application Ser. No. 08/950,984, filed on Oct. 15, 1997 and now issued as U.S. Pat. No. 6,258,395B1, from which priority under 35 U.S.C. §120 is claimed.

BACKGROUND OF THE INVENTION

The present invention relates generally to a method and apparatus for producing comestibles using pressure baking. The method and apparatus are particularly well suited for producing toaster stable comestibles which may be frozen or which may be formulated to include an extended shelf life.

Food products which may be prepared by heating in a toaster have become increasingly popular for reasons including convenience and swift preparation in a fast paced society. Products which are currently produced and designed for re-heating in a toaster include sliced bread, pancakes, french toast and waffles. Unfortunately, however, most other variations of baked products are not well suited for re-heating in a toaster. These products include, but are not limited to, cookies, muffins, most cakes and biscuits. Cookies when re-heated in a toaster will often lose structure, fall apart, and often create a fire hazard. Muffins, though certain types are sliced and toasted, are not designed for optimum toasting in an upright toaster. Most cakes, with the exception of very heavy cakes like a pound cake, cannot produce slices that have appropriate physical integrity. That is, cake slices that are thin enough for upright toasting have a tendency to fall apart in the toaster. Biscuits, if made thin enough, can be reheated in a toaster, but are not designed for easy removal and/or optimum taste characteristics. Moreover, biscuits readily become too dry when prepared in an upright toaster. Also, in an upright toaster, fillings and coatings can be problematic, particularly if they come in contact with the heating grid surface.

In an attempt to provide a broader base of baked goods suitable for re-heating in a toaster, shelf stable and frozen toaster pastries have been developed. Shelf stable toaster pastries include a low moisture pastry surrounding a relatively small amount of low moisture filling. Toppings have been designed for shelf stable pastries that are based on very low moisture starch/sugar suspensions that will not rub off on the heated toaster grating. Shelf stable toaster pastries definitely fill a need in terms of convenience and provide excellent physical integrity in the toasting process, but it is submitted that these products are not particularly appealing when compared with fresh baked goods.

Frozen toaster pastries, on the other hand, are excellent formulations of a toaster stable formula and include a more traditional pastry shell with superior eating properties as compared with the shelf stable products. Unfortunately, however, fillings for frozen toaster pastries are limited in nature to what is appropriate within a pastry shell. Moreover, the process required to make frozen toaster pastries is quite specialized. Even with the availability of shelf stable and frozen toaster pastries, a very limited variety of toaster friendly products are currently available in view of the popularity and demand for such products in the consumer marketplace.

In general, it is submitted that current baking processes do not provide for a broad line of products which may be safely and conveniently heated in an upright toaster. The present invention, in contrast, provides a highly advantageous method and associated apparatus which is capable of producing a wide array of products which are inherently suitable for re-heating in an upright toaster.

SUMMARY OF THE INVENTION

A method of producing a comestible and associated apparatus are disclosed. In accordance with the present invention, a baking mixture is prepared having a moisture content. A mold arrangement is then provided having a mold cavity which is sealable from ambient pressure. The baking mixture is placed in the mold cavity and the mold cavity is then sealed. Thereafter, the mold arrangement is heated with the baking mixture sealed therein such that pressure in the mold cavity rises above ambient pressure and a substantial portion of the moisture content in the baking mixture remains in the mold cavity as the baking mixture heats to form the comestible.

In one aspect of the invention, the baking mixture is formulated to have a density which is approximately equal to the desired density of the comestible to be produced. Thereafter, the mold cavity of the mold arrangement is substantially filled with the density controlled baking mixture. Baking is performed under pressure such that the density controlled baking mixture is not permitted to expand significantly and the moisture content of the density controlled baking mixture is substantially retained thereby producing a comestible having substantially the same density and moisture content as the density controlled baking mixture.

In another aspect of the invention, a baked food product including a filling is surrounded by a baked layer. The improvement comprises an edible encapsulant layer substantially surrounding the filling and disposed between the filling and the baked layer. The encapsulant layer is intended to which maintain separation between the filling and the surrounding baked layer during initial baking and during subsequent storage and re-heating. In one feature, the encapsulant layer is formed of a protein encapsulated starch. In another feature, the filling and surrounding encapsulant layer form a core pocket which is then covered by an outer baking layer. The core pocket may be produced and stored under either refrigeration or frozen prior to incorporation in a pre-baked product for baking.

In still another aspect of the present invention, a baking mixture is prepared including at least one leavening agent provided in a predetermined amount. The baking mixture is then baked in a way which limits expansion of the baking mixture to establish a baked density of the baked comestible and such that the predetermined amount of the leavening agent is sufficient to limit the time required for baking the baked comestible. In one feature, the predetermined amount of leavening agent is determined based on the leavening agent imparting an undesirable taste characteristic to the baked mixture. In another feature, the predetermined amount of leavening agent is substantially greater than a minimum amount of the leavening agent capable of producing the baked density.

In still another aspect of the invention, a leavening agent is present in a predetermined amount sufficiently uniformly distributed throughout a baking mixture at least forming a portion of the baked food product such that the predetermined amount of said leavening agent in the baking mixture is substantially greater than a minimum amount of the leavening agent capable of producing a baked density by causing the baked product to fill the mold cavity. The portion of leavening agent above the minimum amount contributes pressure which forces a portion of the baking mixture against the interior wall of the mold arrangement to form the portion of the baking mixture into a substantially de-aerated crust which surrounds a core portion of the baked food product whereby the substantially de-aerated crust serves to substantially maintain the baked outline of the baked food product when the product is re-heated, even if re-heated from an unfrozen state. In one feature, the core pocket of the present invention, including a filling surrounded by the foregoing encapsulant layer, may itself be surrounded by an outer baked layer including the enhanced substantially de-aerated crust of the present invention.

BRIEF DESCRIPTION OF THE DRAWINGS

The present invention may be understood by reference to the following detailed description taken in conjunction with the drawings briefly described below.

FIG. 6 is a diagrammatic view, in elevation, of an automated production system which incorporates a plurality of ring molds of the type illustrated in FIGS. 4 and 5.

FIG. 7 is a diagrammatic plan view of a production mold arrangement manufactured in accordance with the present invention.

DETAILED DESCRIPTION OF THE INVENTION

Figure 1:
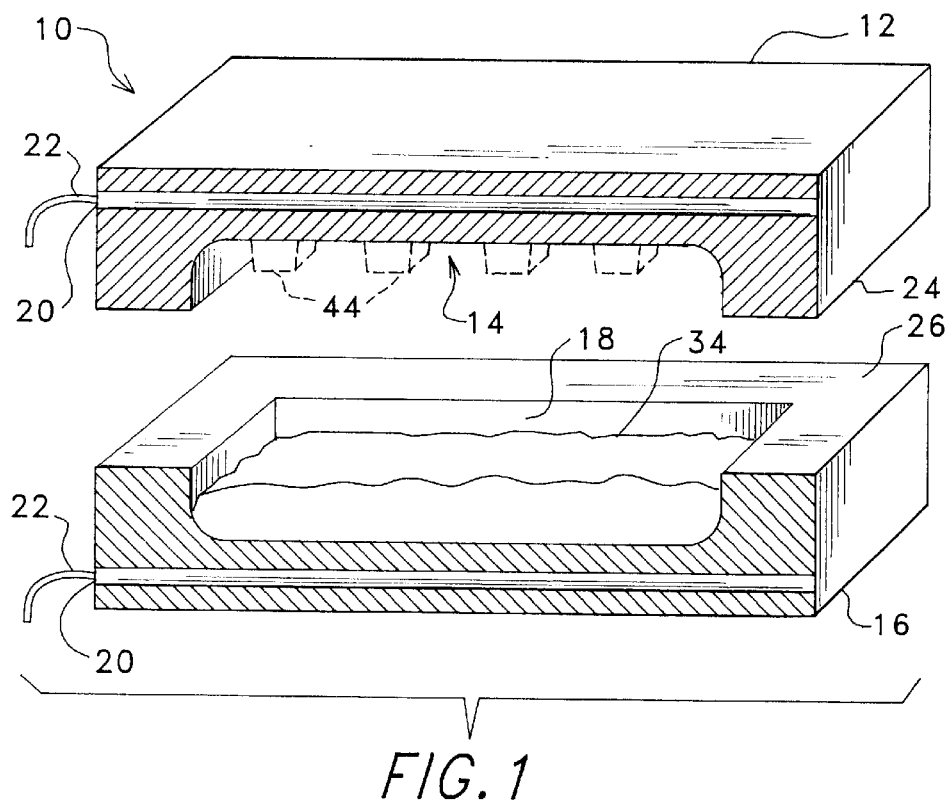
FIG. 1 is a diagrammatic perspective representation, in cross-section, showing a split mold arrangement which is manufactured in accordance with the present invention showing an upper mold half in a position that is separated from a lower mold half.

Attention is immediately directed to FIG. 1, which diagrammatically illustrates, in cross-section, one embodiment of a split mold arrangement manufactured in accordance with the present invention and generally indicated by the reference numeral 10. Split mold arrangement 10 includes an upper mold half 12 defining an upper mold recess 14 and a lower mold half 16 defining a lower mold recess 18. An electrical heating element 20 is positioned within each mold half. Electrical power is supplied to heating elements 20 by electrical cables 22. The upper and lower mold halves may be formed from any suitable material such as, for example, stainless steel. Heating elements may be of any suitable configuration and arranged on or in the mold halves in any suitable manner provided only that the elements are in direct contact with the mold halves and the latter are heated in a sufficiently uniform manner. The heating elements should be capable of maintaining temperatures at the surfaces defining the mold recesses in the range of approximately 250° F. to 700° F. Moreover, any suitable heating technique is contemplated such as, for example, gas heat applied externally to the mold.

Figure 2:
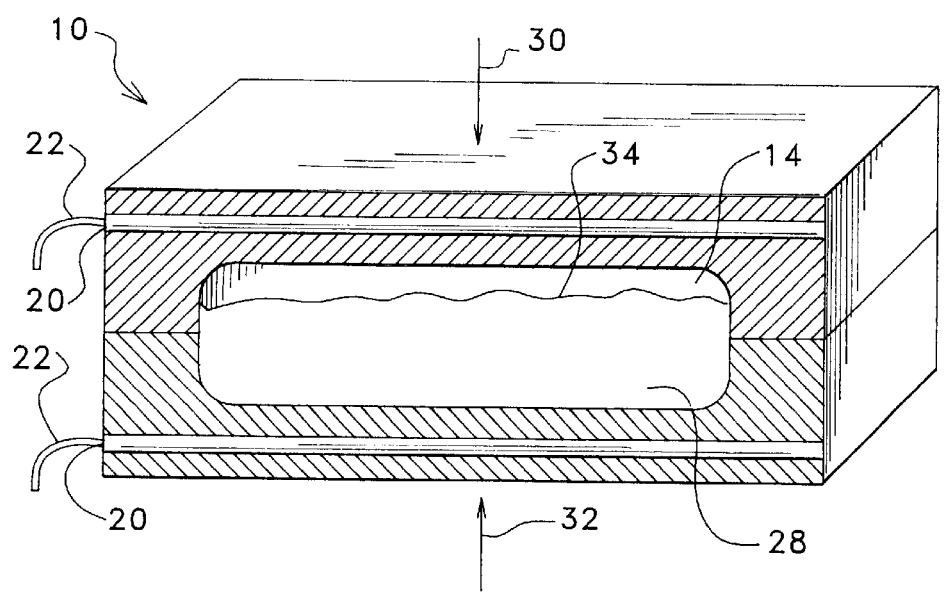
FIG. 2 is a diagrammatic perspective representation, in cross-section, showing the split mold arrangement of FIG. 1 with the upper and lower mold halves in a contacting, closed position which serves to define a mold cavity.

Turning to FIG. 2 in conjunction with FIG. 1, the upper and lower mold halves include confronting surfaces 24 (not visible) and 26 (FIG. 1). It should be noted that the cross-sectional view of FIG. 1 shows approximately one half of the complete split mold arrangement 10 such that, when the mold halves are positioned as shown in FIG. 2 with surfaces 24 and 26 in direct contact, a mold cavity 28 is defined by upper mold recess 14 and lower mold recess 18. Moreover, surfaces 24 and 26 are machined to a predetermined degree of smoothness such that, when sufficient force is applied in the directions indicated by arrows 30 and 32, a pressure seal is achieved which seals mold cavity 28 from ambient pressure, as will be described in further detail hereinafter.

With continuing reference to FIGS. 1 and 2, a description of the operation of split mold arrangement 10 will now be provided. Initially, a pre-measured amount of a baking mixture 34 having a predetermined moisture content is placed into lower mold recess 18 with the upper and lower mold halves in the spaced apart position of FIG. 1. As will be described in detail at an appropriate point below, baking mixture 34 may comprise any form of dough, batter or preformed "dough ball" which surrounds a filling or any suitable food product. Generally, it is desirable to preheat the mold halves before inserting the baking mixture. The mold halves may, of course, be treated with a suitable release agent prior to placing the baking mixture into the lower mold recess. Thereafter, the mold halves are brought into the closed position of FIG. 2.

With the mold halves in their closed position and upon achieving a sufficient seal between the mold halves, the baking mixture is baked in a highly advantageous way. Specifically, it should be appreciated that molding arrangement 10 provides for pressurized baking versus standard oven baking. Since the moisture content of the baking mixture is permitted to escape from the mold cavity only to a limited extent, evaporation of the moisture content of the baking mixture does not serve as a significant factor in cooling the baking mixture. Therefore, rapid baking is achieved by holding the baking mixture at a higher temperature (compared with conventional baking) under vapor pressure, greater than ambient pressure, which results from the moisture content of the baking mixture. Pressures of 0.5 psi to more than 20 psi above ambient pressure are readily achieved using mold arrangement 10. These pressures are accompanied by increases in baking temperature of 5° F. to more than 80° F. above interior article temperatures as compared to a conventional baking environment. Moreover, the continuing presence of the moisture content of the baking mixture within the mold cavity advantageously prevents burning. It is to be understood that some small portion of the moisture content of the baking mixture may be permitted to escape from mold cavity 28 (i.e., the seal between the upper and lower mold halves may actually serve to regulate the desired baking pressure) while achieving the advantages described above and still further advantages to be described below.

Figure 3:
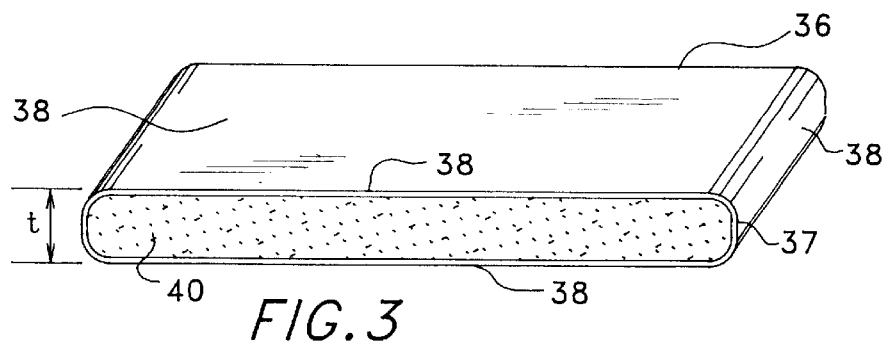
FIG. 3 is a diagrammatic perspective view, in cross-section, illustrating a baked article produced using the mold arrangement of FIG. 1 shown here to illustrate the advantages of the present invention.

Referring to FIGS. 1–3, once baking mixture 34 has been baked, the baked article 36 is removed from molding arrangement 10 by placing the upper and lower mold halves in the open position shown in FIG. 1. It should be mentioned that one advantage of split molding arrangement 10 resides in its ability to produce baked article 36 such that it includes appealing shaped edges 37. It should be appreciated that baked articles made using molding arrangement 10 generally share certain highly advantageous characteristics, irrespective of the specific formula of the baking mixture. In particular, the cross-sectional view of FIG. 3, illustrates that baked article 36 exhibits a continuous, compressed thin shell 38 having a thickness which may range from $\frac{1}{64}$ inch up to approximately $\frac{1}{8}$ inch depending, for example, on the product formula, baking time and mold temperature. Thin shell 38 is produced as a result of the increased pressure within the mold cavity which forces the baking mixture against the heated mold surface such that the thin shell is dense and de-aerated relative to the interior 40 of baked article 36. At the same time, interior 40 of the baked article remains relatively moist, depending, of course, on the moisture content of the baking mixture used to form the baked article. Since thin shell 38 is relatively strong as a result of its compressed, de-aerated nature, it serves to support the relatively moist interior of the article.

Still referring to FIGS. 1–3, further strength is imparted to the thin shell as a result of characteristics including caramelization and crystallization as a result of contact between the baking mixture and the heated mold surfaces. These characteristics are attributed to the known interaction, under heat, of sugars and proteins within the baking mixture. When the baked article of the present invention is placed into a toasting environment, the de-aerated thin shell absorbs heat rapidly, eliminating moisture from the surface while simultaneously serving to encapsulate moisture in the interior of the baked article. Therefore, dry out of the article's interior is minimized during toasting. Still further advantages of the present invention will be described immediately hereinafter.

Referring solely to FIG. 3, it has been discovered that thin shell 38 is particularly advantageous in the production of toaster friendly frozen articles. In particular, the thin shell has been shown to re-conform to the original mold structure when re-heated in a standard toaster. In contrast, standard baking or broiling processes do not provide such an equivalently dense, de-aerated outer crust film. Products produced using standard baking processes and frozen in a deformed shape, therefore, tend to remain in such a deformed shape following toasting. In addition, the crust on such products offers little in the way of a moisture retaining barrier such that the fillings in these standardly produced products have a tendency to dry out. It should be mentioned that this problem is exacerbated with regard to frozen products since they are typically placed in a toaster in a frozen state. Toasting time is significantly increased for frozen products since the filling must not only be heated, but thawed. In this regard, it is noted that primary size restrictions for baked articles intended to be frozen and produced using the present invention are established in view of the time required for re-heating from the frozen state. One useful set of dimensions for frozen baked articles has been found to be a thickness t of $\frac{3}{8}$ inch to $\frac{5}{8}$ inch and an overall rectangular shape of approximately 3 inches by 5 inches. Alternatively, the overall shape may be circular, having a diameter of approximately 4 inches to 5 inches. Of course, any desired shape may be produced with an appropriately shaped mold cavity.

In considering the wide array of products, including shelf stable products, which may be produced in accordance with the present invention, mold cavity volume may vary from less than 3 cubic inches to 25 cubic inches or more in view of size limitations imposed by a typical upright toaster. With regard to minimum volume, it should be remembered that the mold configuration should be established so as to provide a baked article which includes a moist center. If for example, the product is too thin, a primarily crust based item (i.e., mostly comprised of a thin shell) will be produced. With regard to maximum volume, a thickness of 1 inch with a height and width of 5 inches is considered as maximum size for a standard upright toaster. However, larger sizes may be produced for non-standard toasters.

Continuing with a description of the advantages derived in using mold arrangement 10, it should be appreciated that baking times are significantly reduced. For example, items such as cookies and muffins can be baked in approximately one-half the time required by conventional processes. Moreover, baking time is consistent across a wide variety of different formulas. It is anticipated that most articles will bake in the molding arrangement of the present invention within approximately 4–6 minutes, as compared with times ranging from 8–30 minutes in conventional oven processing. In addition, the need for large continuous production ovens is eliminated. It is submitted that significant production savings will be realized for this reason alone.

As noted above, the present invention is highly advantageous in its ability to produce upright toaster compatible baked items essentially irrespective of the baking mixture which is used. It should be appreciated that the present invention contemplates the production of items such as, for example, muffins, cookies, brownies, yeast pastry, biscuits and scones, cakes (ranging from pound cake to very light sponge cake), soda breads, yeast breads (sweet and non-sweet) and filled dough products which may be filled with sweet or non-sweet fillings. These products, when produced in accordance with the teachings herein, will not fall apart or break down while being toasted in a standard upright toaster and will maintain product integrity during removal from the toaster. It should also be mentioned that even though the present invention is essentially universal in consistently producing baked items irrespective of the type of baking mixture used, it remarkably provides that each of these items retains its expected taste, texture and eating characteristics. In and by itself, this feature is highly advantageous.

Referring again to FIG. 1, molding arrangement 10 may include one or more features which result in the formation of cavities or depressions in the surface of the baked article to be produced. For example, projecting mold features 44 are shown as dashed lines in the upper mold recess such that a corresponding pattern of indentations is formed in the baked article produced thereby (not shown). It should also be appreciated that a variety of specialty products can be produced by filling these cavities. For example, these products include pizza and fruit filled Danish suitable for vertical toasting. It should also be appreciated that the present invention provides the ability to manufacture baked articles in a way which further enhances consumer appeal of known products. For example, mold arrangement 10 may be configured to form a "hybrid" muffin which has two tops, since it is submitted that consumers prefer to eat the top portion of a conventional muffin. Still further advantages of the present invention will become apparent in the remaining discussion.

Figure 4:
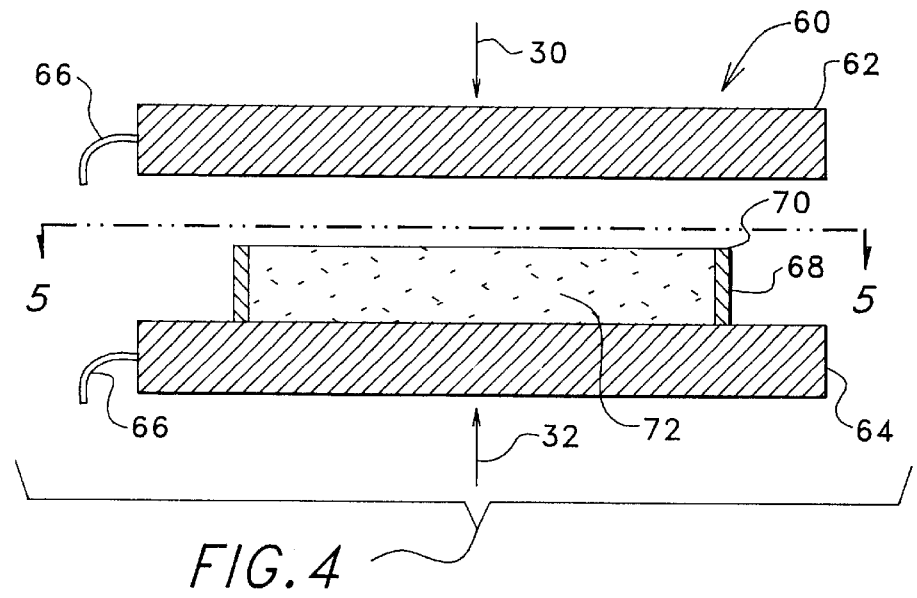
FIG. 4 is a diagrammatic view, in cross-section of a ring mold arrangement which is manufactured in accordance with the present invention.
Figure 5:
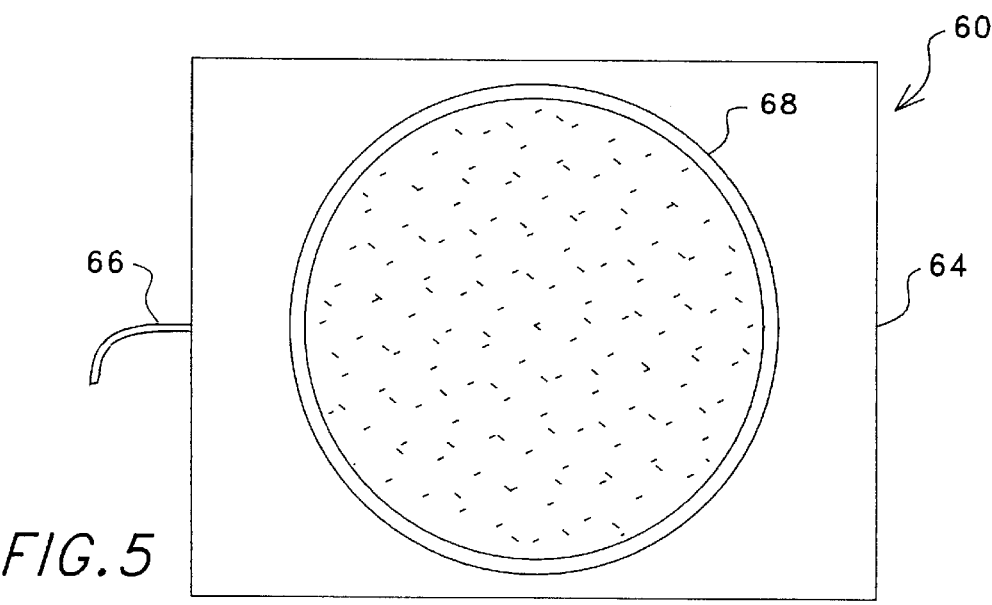
FIG. 5 is a diagrammatic plan view of a lower heated platen and steel ring mounted thereon which form part of the ring mold arrangement of FIG. 4.

Turning now to FIGS. 4 and 5, one embodiment of a ring mold arrangement manufactured in accordance with the present invention is generally indicated by the reference numeral 60. Ring mold arrangement 60 includes an upper platen 62 and a lower platen 64. The upper and lower platens include associated heating elements which are not shown for purposes of simplicity and which are readily providable by one of ordinary skill in the art. Power cables 66 provide electrical power to the platens. The platens are generally formed from materials such as, for example, stainless steel. A steel ring 68 is mounted on the upper surface of lower platen 64, for example, by welding. It is to be understood that ring 68 need not be circular in form. In fact, any desired shape may be used. Dimensions including the diameter of ring 68 and its height may be established in view of the foregoing discussions. Steel ring 68 includes an upper edge 70 such that when the upper and lower platens are moved (not shown) in the directions indicated by arrows 30 and 32, respectively, a pressure seal is attained between the upper edge of the steel ring and the lower surface of the upper platen. In this way, a molding cavity 72 is defined which may receive baking mixture 34 in the same manner as previously described split mold arrangement 10.

Still referring to FIGS. 4 and 5, in the sealed position, heat is transferred from the upper and lower platens into steel ring 68 such that consistent baking temperatures are produced. While other types of metal may be found to be useful in forming ring 68, it has been found that steel produces excellent results. The use of an aluminum ring was found to be unsatisfactory, resulting in inconsistent baking due to excessive heat dissipation caused by the aluminum. One of skill in the art will appreciate that ring mold 60 operates in essentially the same manner as previously described split mold arrangement 10. Moreover, baked articles produced by ring mold arrangement 60 share all of the advantages of articles produced by mold arrangement 10. Therefore, descriptions of baking operations and the advantages of baked articles produced in accordance with the present invention will not be repeated for purposes of brevity and the reader is referred to previously appearing discussions. However, at the same time, one aspect of ring mold arrangement 60 has been found to be particularly advantageous, as will be described immediately hereinafter.

In one technique for using ring mold arrangement 60, in accordance with the present invention, a density controlled baking mixture is formulated with a density which is equivalent to that of the finished baked article to be produced using that baking mixture. Density of the mixture can be controlled, at least in part, by pre-aerating or whipping the baking mixture. In using the density controlled baking mixture, ring 68 is entirely filled with the mixture as illustrated in FIG. 4. Thereafter, the upper platen is sealed against upper edge 70 of ring 68 and baking proceeds. The density and moisture content of the resulting baked article are, therefore, equivalent to that of the baking mixture used to produce it. It is submitted that this technique ensures consistent results and provides significant advantages over prior art baking methods.

Referring briefly again to FIG. 1, it should be appreciated that a single mold configuration filled entirely with the baking mixture may readily be provided by simply eliminating upper mold recess 14. In this way, the technique described in the discussion immediately above may be employed in which lower mold recess 18 can be completely filled with a density controlled baking mixture.

Attention is now directed to FIG. 6 which illustrates an automated system, generally indicated by the reference numeral 80, for producing baked articles in accordance with the present invention. System 80 includes an upper platen conveyor 82 and a lower platen conveyor 84. For the reason that assembly 10 utilizes a number of components which are identical to those which make up previously described ring mold arrangement 60, like reference numbers are applied to like components wherever possible and the reader is referred to previously appearing descriptions of these components. Upper platen conveyor 82 carries a plurality of upper platens 62. Lower platen conveyor 84 carries a plurality of lower platens 64 each of which includes steel ring 68 installed thereon. During the operation of the system, the lower portion of the upper platen conveyor moves in unison with the upper portion of the lower platen conveyor in the direction indicated by an arrow 86.

Still referring to FIG. 6, the upper and lower platen conveyors are arranged in proximity with one another such that a steel ring 68a of a first ring mold arrangement 60a is open to receive a suitable baking mixture. In the present example, a predetermined amount of a batter 88 is dispensed into steel ring 68a by a nozzle 90. Thereafter, as both of the conveyors move, the upper platen 62a, which forms part of ring mold arrangement 60a, comes around the end of the upper platen conveyor so as ultimately be brought into contact (not shown) with ring 68a once movement of the conveyors brings ring mold 60a to the position in which a ring mold 60b is shown in the figure. At this position, each steel ring 68 is sealed by its respective upper platen 62 as a result of the proximity of the upper and lower conveyors such that baking may then proceed under pressure in accordance with the teachings of the present invention, as described above. Of course, electrical power is provided as appropriate during the automated process being described. A series of ring mold arrangements 60c through 60h are shown ahead of the position of ring mold arrangement 60b.

As each of these ring molds reaches the far end of the lower platen conveyor, baking is complete and the baked article within a particular ring mold arrangement is ready to be removed. In the present example, ring mold arrangement 60i is shown travelling around the end of the lower platen conveyor. As it does so, steel ring 68i separates from upper platen 62i and, thereafter, a baked article 92 simply falls out of ring mold 60i and onto a product conveyor 94 which is moving in the direction indicated by an arrow 96, for example, to transport the baked article to a packaging operation. It should be appreciated that a step such as, for example, cooling the baked articles along a latter section of the upper and lower platen conveyors is readily incorporated in the manufacturing operation shown in the figure. Cooling may simply involve turning off electrical heating power to the upper and lower platens of the ring mold arrangements at an appropriate point along the production line and/or routing the conveyors, for example, through a cooling tunnel (not shown). In the instance where the baked article includes indentations/cavities produced, for example, by projecting mold features 44 (FIG. 1) an additional step in the manufacturing process may include filling the indentations with a preselected filling in a known manner.

It should be appreciated that automated system 80 represents a high throughput, energy efficient utilization of the teachings of the present invention. This system is intended as exemplifying only one form of an automated system which employs the teachings of the present invention. Therefore, any number of modifications (none of which are shown) may be performed on this system while remaining within the scope of the present invention. For example, previously described split mold arrangement 10 or another such suitable mold arrangement may be used in place of the plurality of ring mold arrangements used along the upper and lower platen conveyors. As another example, a dough ball or filled dough ball may be placed into the mold by known apparatus such as mechanical fingers. As still another example, the baked article may be removed at the end of the production line by mechanical fingers in a way which avoids damaging the baked article as a result of falling. In yet another example, the baked article might be removed from the ring molds by creating a vacuum between the upper platen and the baked article. The latter may then be released by releasing the vacuum at an appropriate time.

Turning to FIG. 7, a production mold arrangement 100 is illustrated. Mold arrangement 100 includes a large heated lower platen on which are positioned a plurality of steel rings 68. One of skill in the art will recognize that mold arrangement 100 is used in the same manner and shares the same advantages as one of previously described split mold arrangements 10 or ring mold arrangements 60 except that a plurality of mold cavities 102 are provided for simultaneous use. After placing a predetermined portion of baking mixture (not shown) into cavities 102, the latter are covered by a large heated upper platen which is not shown for purposes of clarity. It is noted that a plurality of individual heated upper platens may be used as wherein each cavity 102 is sealed by an individual upper platen. While arrangement 100 has been described using the ring mold configuration of FIGS. 4 and 5 (i.e., each mold cavity is essentially defined by one of the mold halves), it should be appreciated that the use of a split mold configuration or any other suitable, pressure retaining configuration is contemplated.

From the foregoing discussions, it is evident that the present invention provides a universal process for the production of toaster compatible baked articles which exhibits consistent results across a wide range of baking mixture formulations. Therefore, a great variety of different products may advantageously be produced using one relatively simple apparatus. Moreover, the present invention contemplates efficiency and high throughput by dramatically reducing baking times as compared with conventional oven baking. It should be mentioned that while the present invention directly addresses the production of toaster compatible products, these products are suitable for re-heating in other ways such as, for example, by using a toaster oven.

As described above, fillings have been particularly problematic with regard to reheating in a toaster environment. Many prior art products have been provided in frozen form for reasons to be described below. In this regard, it has been discovered that the de-aerated crust of the present invention serves in a highly advantageous way during re-heating. That is, the de-aerated crust serves not only to re-conform to its original mold outline and to prevent moisture from escaping from the product interior, but also conducts heat to the interior of the product. The product can therefore be warmed up in a standard toasting environment in a way which thaws the frozen interior, including a frozen filling, usually in a single cycle without over browning or excessive toasting of the outer surface of the de-aerated crust. As a result of the ability of the product to absorb heat, change in the appearance of the product is limited within normal reheating limits.

Figure 8:
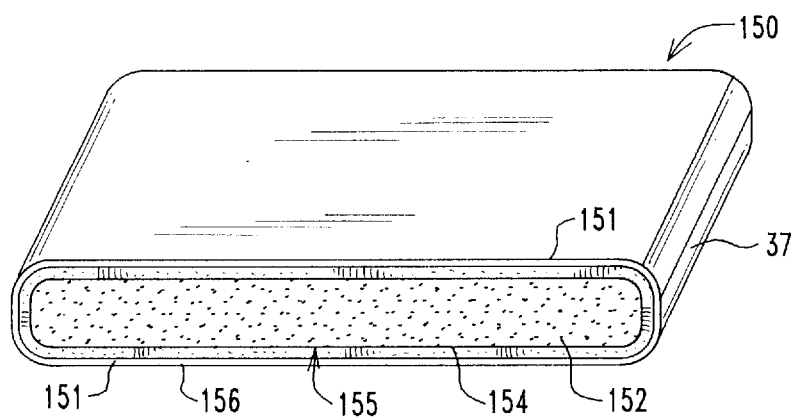
FIG. 8 is a diagrammatic perspective view, in cross-section, illustrating a filled baked article produced using the mold arrangement of FIG. 1 shown here to illustrate certain characteristics and advantages of the filled baked article in accordance with the present invention.

Turning now to FIG. 8, a filled baked article produced in accordance with the present invention is generally illustrated by the reference number 150. Because filled baked article 150 is produced using split mold arrangement 10 of FIGS. 1 and 2, it is similar in a number of respects to previously described baked article 36 of FIG. 3. In particular, filled baked article 150 includes appealing shaped edges 37. More importantly, an enhanced thin de-aerated crust or shell 151 is also present. Enhanced thin crust 151 is similar to previously described thin crust 38 with the exception of certain differences which will be described at an appropriate point below.

In accordance with the present invention, filled baked article 150 includes a filling 152, which is surrounded by a thin, edible encapsulant layer 154 having characteristics to be described in detail. The combination of encapsulant layer 154 and filling 152 may be referred to as a core pocket 155. The latter is, in turn, surrounded by an outer layer 156 which is formed from previously described baking mixture 34. A portion of baking mixture 34 forms enhanced de-aerated crust 151.

Still referring to FIG. 8, in accordance with the present invention, encapsulant layer 154 is formed using a protein encapsulated starch, which may alternatively be referred to as a pasta. As described, for example, in Dough Rheology and Baked Product Texture, edited by Hamed Faridi and John M. Faubion, published by Van Nostrand Reinhold, 1990, the microstructure of pasta is such that the surface of freshly extruded or rolled pasta is a continuous protein film. The inner portion of pasta is a compact structure of starch granules embedded in an amorphous protein matrix. Starch granules and protein are aligned in layers parallel to the protein film on the surface of the pasta. After proper drying, there is essentially no change in this structure. Improper drying or elevated dough temperatures disrupt the continuity of the protein film and the underlying matrix. While pasta is being cooked, protein hydration and starch gelatinization move from the surface of the pasta inward toward its center (Grzybowski and Donnelly, 1977). In the instance of good quality pasta, the protein absorbs water causing the protein to swell more rapidly than the starch. The result is a continuous fibrillar network of denatured protein which surrounds the gelatinized starch granules (Resmini and Pagoni, 1983).

In comparison, most dough-based products use combinations of starch, protein and water to obtain appropriate structure which is generally a complex of starch, water and protein, with the protein being in a matrix structure rather than forming a continuous fibrillar network as in a pasta system. Thus, what differentiates products defined as pasta from normal bread, pastry and other dough-like products relates to utilization of protein in the structure relative to partially or fully gelatinized starch (gelatinized starch being starch swollen with water as opposed to a starch granule or crystal). As another difference, protein derived from the flour base in pasta (wheat, rice or other grains) forms the exterior protein film structure on the outside material, described above, to encapsulate the starch.

When cooked, for example by par boiling, the cooked characteristics of pasta are defined by the described microstructure, assuming overcooking is avoided. The starch imbibes water and expands, while simultaneously being trapped in the protein film. The term "al dente" is used to describe optimum eating characteristics of cooked pasta relating to the starch being very turgid or swollen without breaking through the protein film. This is similar to a balloon being over-filled with water prior to breaking. The exterior protein film coupled with that turgidity also provides a slippery characteristic which allows pasta to be a base for sauce without absorbing the sauce. The present invention relies on the impervious nature of the outer protein film layer to maintain filling integrity in a baked filled product so as to "entrap" the filling during baking and subsequent reheating. In and by itself, the ability to sufficiently maintain the integrity of a filling pocket is a significant accomplishment in baked goods suitable for reheating in a toaster. The overall characteristics of encapsulant layer 154 have been found to be highly advantageous in the present application. In this regard, the encapsulant layer has been found to serve as an effective barrier to both oil and water based filling materials. That is, the filling may be comprised of oil and/or water containing materials such as, for example, cheddar cheese, tomato sauce, chocolate, custard, cream cheese, sour cream, straight pure margarine or butter, flavored olive oil among many others. This result is attributable to the impervious nature of the protein film as against both oil and water. Other characteristics of encapsulant layer 154 as a barrier layer for use in a food product will be discussed below following a brief discussion of related aspects of the prior art.

In the prior art, the problem of encrusting of fillings in toaster reheatable products has typically been addressed using a high fat pastry-like crust. In fact, the fat content may exceed the flour content. This approach is somewhat effective in the instance of water and fat based fillings. Unfortunately, however, this solution may be significantly limited in effectiveness if a filling such as cheese is utilized which is likely to undergo rapid expansion during baking. A high fat pastry shell has been observed to often break or allow the cheese to leak out during either the baking or toasting processes. It is submitted that a fat barrier layer serves poorly in resisting expansion by a filling having a tendency to expand more rapidly that the pastry shell during a baking or reheating process. A very high fat pastry shell, such as found in a fried pie, tends to hold high levels of filling and is generally suited to a toaster environment. That is, the high fat content rapidly absorbs heat and serves to minimize burn-up of the shell, although containment of high fat fillings remains a concern. For example, high levels of a cheese material may break through, due to rapid expansion of the cheese against a rigid high fat shell. For these reasons and more reasons yet to be described, the present invention considers a high fat approach to encapsulant layer 154 as being an unacceptable solution for stabilization of fillings in a baked product during a baking process or during subsequent toaster reheating.

In an attempt to cope with the problems presented by filled toaster products, modifications have been made to assist the effectiveness of a high fat pastry type shell. For example, relatively low ratios of filling to shell have been used or very thin filling layers have been employed. While these approaches are effective, consumer appeal may be reduced considerably since the amount of filling is quite limited. Unfortunately, even under low filling ratio or thin filling layer conditions, filling materials such as Swiss cheese or cheddar cheese may continue to be problematic by leaking out of the high fat shell. Moreover, Applicants are unaware of the use of an encapsulant layer in the in the interior of a food product serving to entrap a filling.

Still referring to FIG. 8, it should be appreciated that encapsulant layer 154 of the present invention is advantageously comprised of a material having rubber or elastic-like characteristics and is, at the same time, solid and non-aerated in nature while being dough based. Unlike state of the art pastry systems which use a crust defined by a high fat content characteristic, the encapsulant layer of the present invention is readily formulated with little or no fat present. In this regard, the encapsulant layer of the present invention functions in a dual capacity as a fat and/or water barrier, wherein the fat barrier characteristic is critical to the encapsulation of materials such as cheeses and sauces having an oil/fat content. One advantageous aspect of the rubber-like characteristic of encapsulant layer 154 resides in its ability to expand. Specifically, fillings of either water or oil-based materials may be permitted to expand significantly within encapsulant layer 154 without rupturing the membrane of the encapsulant layer. Actual testing using filling materials such as, for example, cheese sauce, chocolate sauce, salsa and others have exhibited a remarkable ability of encapsulant layer 154 to maintain the integrity of a pool of liquid or semi-liquid filling material in the core of a product as compared with prior art approaches. In this regard, the present invention contemplates a wide range of possible fillings, as will be described at an appropriate point below.

With continuing reference to FIG. 8, another advantage of encapsulant layer 154 is found in its eating characteristics upon warming in a toasting environment. Remarkably, one attribute of encapsulant layer 154 which makes this encapsulant so appropriate for its intended application is the imperceptible nature of the encapsulant layer upon consumption. That is, the encapsulant layer melds in with the baking mixture of which outer layer 156 is composed and essentially does not impart any of its own characteristics to outer layer 156. It is noted that this characteristic is present immediately after baking and remains even if the product is reheated. At the same time, encapsulant layer 154 serves to maintain the separation between filling 152 and outer layer 156. The importance of maintaining this integrity is significant since penetration of filling 152 into outer layer 156 will most generally produce a soggy or doughy texture in outer layer 156 which is unpleasant to the palate. Moreover, the isolation between the filling and outer layer is maintained irrespective of the formulation of the filling, be it either oil and/or water based. Encapsulant layer 154 further serves during reheating by expanding in response to expansion of filling 152 during the reheating process in a toasting environment, generally conforming to the outline of the filling.

It should be mentioned that, prior to the development of encapsulant layer 154 using a pasta-like formulation, a number of other approaches have been formulated and tested by Applicants. One of these alternative approaches is based on the use of a cellulose based edible film as encapsulant layer 154. Tested films include hydroxy propal cellulose and methyl cellulose. Unfortunately, it has been discovered that these films under heat and in the presence of moisture simply dissolve into water present in the adjacent dough and/or filling mixture. Therefore, the cellulose film approach is considered as being inferior. As another approach, a thin film denatured protein structure was formed using cheese. Such a structure can be formed, for example, using cheese layers in the presence of microwave energy. While a denatured protein filling "bag" or barrier has been successfully created in this way, the eating characteristics of the bag are orally detectable and difficulty is encountered in sealing the bag with the filling therein. Nonetheless, fillings have been successfully retained by the denatured protein bag even using the pressure baking technique of the present invention. Depending upon the combination of filling and surrounding layers, the denatured protein bag may prove to be use in applications such as, for example, cheese fillings.

As described above, filled baked food product 150 has been produced in accordance with the pressure baking method of the present invention to form enhanced thin crust 151. In this regard, it should be appreciated that pressure baking serves to emphasis certain advantages of encapsulant layer 154 when the use of a filling is desired. For example, problems encountered in producing a filled product are generally exacerbated by pressure baking. Fillings may readily expand during the pressure-baking process, causing the filling to explode out of the product in the absence of encapsulant layer 154 once the product is released from the molds. Alternatively, during product cooling after baking, the filling may shrink, tending to leave air space when cooled. Encapsulant layer 154 of the present invention has been found to respond remarkably well in either of this situations. Due to its elastic nature, the encapsulant layer tends to maintain conformity with the filling in response to both expansion and shrinking of the filling.

Another problem, which is generally increased in magnitude by pressure baking, resides in fillings intermixing with surrounding baked outer layers, losing the filling identity and possibly causing the outer layer to become soggy, as described above. Again, encapsulant layer 154 of the present invention has proven to be remarkably effective in eliminating this problem. The integrity of core pocket 155 has been found to be highly resistant to breach of any kind by a wide range of fillings under normal pressure and non-pressurized baking conditions and in a typical toaster warming environment. It should be mentioned that the use of encapsulant layer 154 is contemplated in the production of baked goods without the use of pressure baking techniques. For example, products not intended for re-heating such as, for instance, a fruit pie filling within a cake type structure may be produced using the encapsulant layer and core pocket of the present invention. At the same time, it should be appreciated that the use of the pressure baking technique of the present invention is considered to be highly advantageous when used in combination with the filling core pocket of the present invention, as will be described immediately hereinafter.

With continuing reference to FIG. 8, it should be appreciated that filled baked food product 150 represents a highly advantageous system, particularly with regard to toaster reheatable products. This system includes two components. The first component of the system is encapsulant layer 154 which serves as a pliable membrane to contain filling 152. While the encapsulant layer is highly advantageous in and by itself, it is intended to define the overall outline of a product to a limited extent in a filled toaster reheatable product. The second component of the system is enhanced thin crust 151. The latter provides more than an adequate degree of support for the encapsulant layer and intervening baked outer layer 156 in defining an outline suitable for toaster reheating, particularly in consideration of filled frozen products suitable for toaster reheating. In this regard, it should be appreciated that enhanced thin crust 151 is not only dense and de-aerated upon initial removal from its mold, but is also quite devoid of moisture. However, any product, during frozen storage, will tend to equalize in moisture content. That is, thin crust 151 will tend to absorb moisture. As described above, when placed into a toaster reheating environment directly from a frozen state, the thin crust/shell almost immediately dries out. Upon this drying, the initial strength of the thin shell in its dry state is substantially restored. In fact, this drying has been found to be complete substantially prior to thawing of the frozen filling of the product. At the same time, the thin crust tends to "remember" its initial molded outline and returns to that shape as it dries. Therefore, enhanced thin shell 151 serves to compliment the function of encapsulant layer 152 in an ideal manner. That is, by the time, filling 152 and encapsulant layer 154 have thawed to the point of requiring physical support, thin crust 151 has dried and is more than capable of providing the required support. In this regard, previously described thin crust 38 of FIG. 3 is also well suited in the application of frozen filled products. It is submitted that this system, with the combination of these two components, is highly advantageous and has not been seen heretofore in a pre-frozen filled product suitable for warming in a toaster environment. Further advantages specifically associated with enhanced thin crust 151, as well as its method of manufacture, will be described below.

In accordance with the present invention, it has been discovered that the advantages of the pressure baking method described above are enhanced in significant ways by formulating baking mixtures in a specific manner. In particular, high levels of leavening agents are used. Leavening agents typically emit a gas such as carbon dioxide when combined with water and then heated above a minimum temperature which is readily exceeded in a baking process. These leavening agents include, but are not limited to baking powder and baking soda.

In standard baking practice, normal levels of leavening agents contribute a lightness to baked goods by entraining the emitted gas in the baked goods to form small voids during baking. If an excessive amount of leavening agent is added to a baking mixture, the normal result is an overflow wherein the volume of the baking mixture increases well beyond the size of the vessel in which it is being baked. In the prior art, adding excess leavening agent is therefore viewed as being a detriment and, in fact, as being wasteful.

Excess leavening agent can readily be defined as any amount of leavening agent beyond a minimum amount which would increase the volume of a baked good beyond a desired size or volume when expansion is unconstrained. In this regard, it should be appreciated that the pressure baking method of the present invention also serves to control the density of the baked product to be produced. Even in the presence of excess leavening agents, the baked product can only expand to the extent permitted by the mold cavity. Remarkably, when excess leavening agent is added to baking mixtures such as the baking mixture used to produce outer layer 156 in FIG. 8, two unanticipated benefits are produced. First, baking time is shortened significantly. It is now appreciated that the addition of the excess leavening agent causes pressure in the mold cavity to rise significantly due to gases released by the excess leavening agents. In a repeatable test, a product previously requiring 7 minutes baking time at a mold surface temperature of 350° was baked in approximately 4.5 minutes using the same 350° mold surface temperature simply by adding excess leavening agent. Thus, baking time was reduced by more than 35%. In and by itself, this is a sweeping advantage in contemplation of high production commercial bakeries. Furthermore, the result was a more uniform product as well as improved eating and flavor characteristics. Baking time may be reduced still further by increasing the mold surface temperature, as will be described.

A second, highly advantageous benefit of the use of excess leavening agent in the pressure baking method of the present invention is related to the characteristics of enhanced thin crust 151. Specifically, enhanced de-aerated crust 151 gains a significant degree of strength due to the increase in baking pressure caused by the excess leavening agent. Generally, the properties of the thin de-aerated crust are thought to remain essentially unchanged, however, its density is submitted to be increased and its uniformity is submitted to be improved by the excess leavening agent. Filled baked product 150 was described above as being pre-frozen and placed directly into a re-heating environment in this frozen state. In this regard, it should be appreciated that thawed fillings have been quite problematic in the prior art. Fillings that are quite liquid when thawed, and possibly even more liquid upon heating, are of particular concern due to an increased tendency to penetrate and leak out of surrounding layers. With liquid or liquid-like fillings in a fluid state prior to reheating, more time is available during which penetration of surrounding layers can occur. Applicants believe that the non-availability of baked products (1) having liquid or near liquid fillings and (2) designed to be stored without freezing is attributable to the foregoing problems.

Aside from the prior art inability to sufficiently encapsulate a liquid filling, it is submitted that a third important reason for the lack of refrigerable liquid filled baked goods resides in the self support required in a liquid filled product. It should be appreciated that a frozen filling is essentially self supporting by virtue of the fact that the product remains frozen until warmed. In a non-frozen or refrigerable product, the shell or crust of such a product does not enjoy the benefits of a rigid, frozen filling which are limited to storage and handling purposes. For this reason, the pastry shells of prior art frozen products are generally incapable of adequately supporting a non-frozen filling prior to reheating. If such a product is allowed to thaw prior to being reheated in a toasting environment, the product will most likely break apart or leak filling upon being handled. The present invention substantially resolves these problems in the instance of refrigerable liquid or semi-liquid filled baked products suitable for reheating in a toaster environment, as will be described.

Referring again to FIG. 8, baked filled product 150 has proven to be effective with regard to refrigerated storage. This advantage is attributed to the system combination of enhanced thin shell 151 and encapsulant layer 154. The latter serves, as described above, to retain filling 152, even in a generally liquid state, within core pocket 155. At the same time, enhanced thin crust 151 provides a degree of support in forming the overall outline of the product which has not been seen heretofore. The excess leavening agent technique of the present invention is thought to improve the characteristics of enhanced thin crust 151 to a degree which causes the enhanced crust to be relatively resistant to moisture penetration even in a refrigerated environment over a relatively long period of time. Therefore, enhanced thin crust 151, in cooperation with encapsulant layer 154, results in practical, refrigerator stable, toaster reheatable products which may contain fillings with liquid-like characteristics. Of course, semi-liquid, semi-solid or solid fillings are extremely well suited for use in the encapsulant system with either of enhanced thin crust 151 or thin crust 38 produced in accordance with the pressure baking method of the present invention. Non-filled baked comestibles may advantageously be produced having enhanced thin crust 151. For example, muffins, cookies and virtually any dough or batter based product that is produced with the enhanced thin crust of the present invention will not crumble or fall apart in a toaster while the inner core of the product remains moist and exhibits the same eating characteristics of that particular product as when produced in normal baking.

It should be appreciated that a particular limitation exists with regard to the use of excess leavening agents in accordance with the method of the present invention. This limitation is not related to pressure produced during baking, but rather to the taste characteristics of the leavening agent employed. Most leavening agents have a characteristically unpleasant taste. For example, baking soda contains sodium bicarbonate which is characterized by a salty taste. At some point, when excess leavening agents are added to a baking mixture, this characteristic, undesired taste or flavor will become apparent in the overall taste of the product. Therefore, the point at which the undesired taste is noticeable is considered as an upper limit for excess leavening agent content. During testing, excess leavening agents have been added in the range of approximately 50% to 200% above levels specified in standard baking formulations. Using this range of excess leavening agents, enhanced thin crust 151 was produced, accompanied by a reduction in baking time in the range of approximately from 25 to 50%.

At some point above doubling the normal amount of leavening agents, the upper taste limit will be encountered at which the undesired taste characteristic of the leavening agents will become problematic. It should also be appreciated that some recipes may encounter the leavening agent taste limit at relatively lower levels dependant upon the specific taste attributes of the recipe. Until the point at which the taste limit is reached, the characteristics of the enhanced thin crust of the present invention continue to improve as the amount of leavening agent is increased. Therefore, in most products, it is anticipated that leavening agents should be added to just below the taste limitation so as to maximize the characteristics of enhanced thin crust 151.

Another, less important limitation exists with regard to the use of excess leavening agents. In some instances, for example, a product may become overly brown with the use of excess leavening agents. Therefore, in some recipes, this browning factor may define the upper limit of the content of excess leavening agents.

Still considering the method of the present invention with regard to producing enhanced thin crust 151 as accompanied by a reduction in baking time and with reference to FIG. 2, surface temperatures of mold arrangement 10 should be adjusted upward in the range of approximately 5 to 50 degrees F. in order to most fully realize the advantages of the excess leavening agent technique of the method of the present invention. This temperature increase serves to further expedite pressure build up within the mold cavity which may even further improve the desired characteristics of enhanced thin film crust 151.

Applicants submit that the highly advantageous use of excess leavening agents, as described herein, has not been seen heretofore. That is, it is neither normal nor known to add additional levels of leavening agent beyond what is required in standard recipes. In fact, the use of excess leavening agents is impractical in the absence of the teachings herein with regard to density controlled baking.

Still referring to FIG. 2, with regard to mold arrangement 10, the machined characteristics of surfaces 24 and 26 may be used to control the degree of pressure seal between the confronting mold halves, as described above. In addition, it has been discovered that enhanced thin crust 151 can be formed effectively with sufficient bias of the mold halves against one another. Moreover, this bias is readily achieved without the need for a locking mechanism which locks the mold halves together. In accordance with the present invention, the mold halves may be resiliently biased using springs (not shown) or upper mold half 12 may be simply be weighted to provide a sufficient pressure seal. In this regard, it has been found that a weight in the range of 10 to 20 pounds of pressure per square inch on sealing surfaces 24 and 26 produces the contemplated results when the sealing surfaces include a width of approximately 1/16 to 1/8 inches It should be appreciated that, in the prior art, production line baking equipment typically employs somewhat complicated locking mechanisms which serve to lock mold halves against one another. Due to considerations such as mechanical wear of the mold halves, such locking mechanisms can be problematic and unreliable. The elimination of the need for mold locking mechanisms in accordance with the present invention is considered to be highly advantageous. It is noted that excellent results have been achieved by the present invention even when the mold halves separate slightly near the end of the baking time. This result suggests that the thin crusts or enhanced thin crusts of the present invention are formed during that initial portion of baking time when the baking mixture is quite fluid and under significant pressure.

Filled baked product 150 may be produced with a wide range of fillings, as mentioned. Products include simulated bread formulas filled with cheese. In this regard, low fat cheeses have been found to produce excellent results. In the prior art, low fat cheese has been problematic primarily due to its poor melting characteristics. In the method of the present invention, pressure baking at substantially high temperature uniformly melts low fat cheese causing it to be quite liquid. At the same time, encapsulant layer 154 prevents leakage of the cheese during both pressure baking and product reconstitution in a toasting environment. In actual testing, an excellent cheese effect with regard to eating characteristics has been achieved using low fat cheese with virtually no leakage of the cheese outside of its core pocket. Low-fat cheese in conjunction with meat and other materials also has been found to produce filled sandwiches with excellent eating characteristics. It should be appreciated that without the core pocket of the present invention, virtually any type of cheese placed in bread will result in a wide dispersion of cheese throughout the bread and no heavy pocket of cheese. However, cheese placed in the core pocket of the present invention will result in a highly defined center pocket of cheese within the bread rather than dispersed cheese particles. The present invention is highly advantageous in any filled good where a dense or heavy pocket of filling is desired. For this reason, the present invention is also applicable in the production of baked goods in which filling is normally injected after baking specifically to achieve a dense, heavy filling pocket. For example, custard filled doughnuts are normally produced using injected filling.

Figure 9:
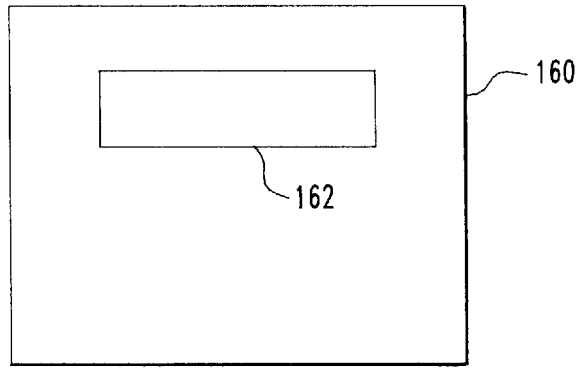
FIG. 9 is a diagrammatic plan view illustrating an intermediate step in producing a core pocket used in the filled article of FIG. 8 showing a filling positioned on a sheet of encapsulant material.

Turning to FIGS. 8 and 9, the method of the present invention will now be described in further detail. FIG. 9 illustrates a sheet portion 160 of encapsulant layer material, in a pre-cooked state, having a portion 162 of filling 152 positioned thereon for encapsulation. Sheet portion 160 may be formed, for example, using a mixture of wheat gluten (wheat protein), durum flour (from durum wheat), eggs and water. It is noted that eggs are not required. Other ingredients may be substituted for or added for purposes of further enhancing the barrier capabilities of encapsulant layer 154 (FIG. 8) to ultimately be formed or for other reasons, including, but not limited to wheat gluten, dried egg albumen, vegetable based albumen and various surfactants. Dry ingredients are mixed in a suitable manner while liquid (water and eggs, if used) are slowly added. Initially, the mixture will develop a wet, granular consistency during mixing. Further mixing then releases sufficient protein from the wheat or gluten containing ingredients, resulting in binding the mixture into a continuous pasta dough. That is, a protein encapsulated starch dough. Thereafter, the pasta dough mixture is allowed to cool and rest briefly. It is noted that bread dough, having higher levels of water would begin to rise at this stage because of the activity of yeast present in the dough or other organisms, since the small amount of water present in the pasta dough mixture does not allow gas-forming organisms to function. If, however, the pasta dough mixture is left long enough at room temperature, moisture on the surface will result in mold growth and so should be avoided. The pasta dough mixture product can be used once cooled or refrigerated or even frozen, thawed and used at a later time. A portion of the pasta dough mixture can then be rolled out to form sheet portion 160 including a thickness in the range of approximately 0.005 inches to 0.010 inches. It should be appreciated that the sheeting process or rolling out process helps further distribute and form the protein film, contributing further to the unique characteristics of encapsulant layer 154 within a final baked product.

Alternatively, sheet portions of the pasta dough mixture can be formed rapidly from the original bulk mixture using extrusion. However, extrusion generally will not give the most optimum protein film structure in encapsulant layer 154. In fact, this difference should be considered when fillings such as cheese, which are traditionally difficult to encapsulate are to be used in a toaster stable product. Therefore, the more the pasta dough mixture is subjected to sheeting action (i.e., repeated steps which result in a progressively thinner sheet), for example, between pressure rollers, the better developed are the protein film characteristics of sheet portion 160. Sheeting affects the strength of the pasta dough mixture in a positive way. A stronger mixture is more resilient and, therefore, is appropriate for use when rolled thinner than a corresponding "weak" dough. Nonetheless, even crude extrusion production is likely to produce an effective encapsulation barrier so long as sufficient protein structure is generated.

Figure 10:
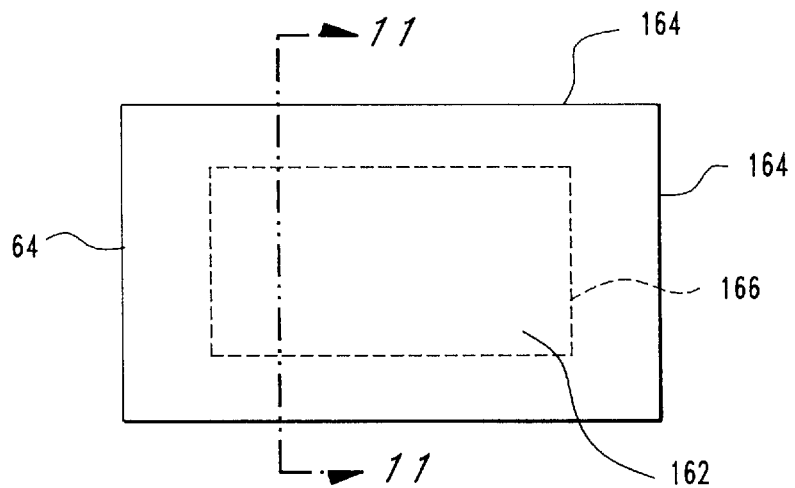
FIG. 10 is a diagrammatic view plan view illustrating a further step in producing the core pocket used in the filled article of FIG. 8 showing the encapsulant material folded over the filling along with edge portions of the encapsulant sheet sealed to one another partially surrounding the filling.
Figure 11:
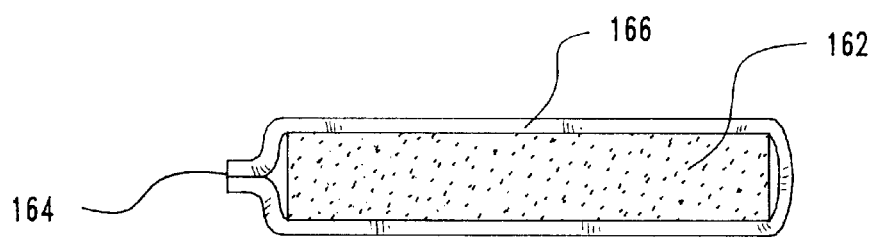
FIG. 11 is an elevational view, in cross-section, of the core pocket of FIG. 10 shown here to illustrate further details of its structure.

Referring to FIGS. 10 and 11, sheet portion 160 is folded over filling portion 162 and edges 164 surrounding the filling portion are sealed against one another. Sealing can be accomplished, for example, by pressing. During this step, efforts should be made to remove excess air from an encapsulation pocket 166 containing filling portion 162. Edges 164 may be trimmed to eliminate excess dough at these edges.

Figure 12:
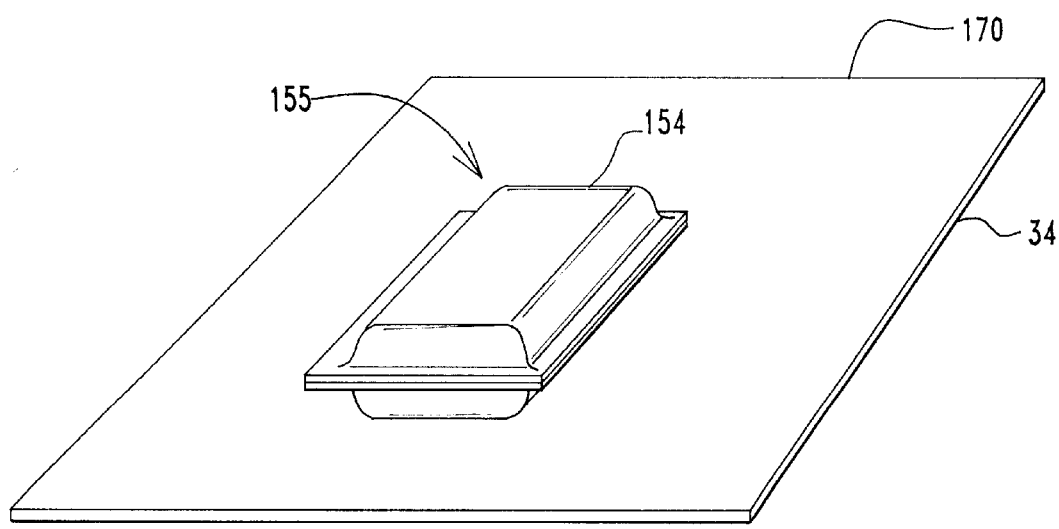
FIG. 12 is a diagrammatic perspective view illustrating the core pocket of FIGS. 10 and 11 positioned on a lower sheet of baking mixture as an intermediate step in the formation of the baked article of FIG. 8.

FIG. 12 illustrates core pocket 155 following the additional step of cooking (not shown) the raw core pocket for a short period of time, for example, in boiling water. The cooking step realizes the desired protein film structure characterizing encapsulant layer 154. It is to be understood that this cooking process can be done in many ways including, but not limited to steaming, hot water spray on a production line, a continuous bath or any combination thereof. As described above, sheet portion 160 will swell and become turgid in the cooking process in forming encapsulant layer 154. The cooked sheet portion is more translucent than its uncooked counterpart and, depending upon the thickness of the encapsulant layer, may approach transparence. The water imbibed in cooking the encapsulant layer results in the gel-like characteristics useful in the barrier function of the encapsulant layer. It is noted that pasta dough sheet portion 160 should not be pre-cooked prior to sealing filling therein to form a core pocket since the desired film characteristics post-cooked sheet portion are likely to result in great difficulty in sealing the core pocket.

Core pockets may be frozen after being sealed or par cooked and then frozen as alternatives to immediate use. Frozen core pockets, pre-cooked or otherwise, may be stored for an long periods of time and used when appropriate.

Having described one manner of forming core pocket 155, it should be appreciated that the core pocket may be formed in a great number of alternative manners (not shown) even in a commercial production line setting. For example, mold arrangements may be used in which sheet portions of the pasta dough mixture are laid across a plurality of mold cavities defined in a lower mold half. Filling portions may then be placed in the cavities onto the lowermost layer of pasta dough. It is noted that this technique may utilize a liquid filling. Thereafter, a second sheet of pasta dough is laid across the mold arrangement covering the filling portions and contacting the lowermost layer therebetween. An upper mold half is then aligned and pressed against the lower mold half to force excess air out of the mold cavities while sealing the filling portions in the mold cavities and separating the sealed core pockets from one another. With an appropriate lower mold half configuration (not shown), the need for an upper mold half may be eliminated. That is, for example, a roller may be rolled across an appropriately configured lower mold half to accomplish sealing and separation of the core pockets.

It is contemplated that a conventional ravioli production line is advantageously adaptable to the present invention to the extent of forming core pockets. In this connection, continuous upper and lower sheets of pasta dough mixture can be brought together with placement of filling portions therebetween in an automated production line. Of course, the core pockets are not intended for consumption at this stage in production and subsequent use of the core pockets in the baked food products of the present invention requires additional steps, as will be described.

Referring to FIG. 12, cooked core pocket 155 is placed on a sheet 170 of baking mixture 34. The latter may be bread dough including yeast and chemical leavening agents. In order to develop bread-like characteristics and depending upon the baking technique to be used, a certain amount of development time for dough containing yeast may be permitted. If the pressure baking technique of the present invention is to be used, the baking mixture may be allowed to rise once to contribute to its bread-like characteristics such as, for example, dough may double in volume and then is kneaded or sheeted to its pre-rise density. However, a second rise immediately prior to baking is not considered as being necessary. Layer 170 is then coated (not shown) with a starch and water paste to insure that the core pocket adheres to the proper location and that this layer adheres to a subsequent layer to be described. The starch and water base may be applied, for example, by spraying or light brushing. Its application over the core pocket has no detrimental effect on the characteristics of encapsulant layer 154 an serves to fix subsequent layers to be described below. Depending upon the characteristics of the baking material including its moisture content, the application of an adhesive starch/water or similar such mixture may not be needed. It should be appreciated that more than one layer of baking material may be applied. In fact, alternating layers of varying or like thickness may be used having differing flavor and/or color characteristics.

Figure 13:
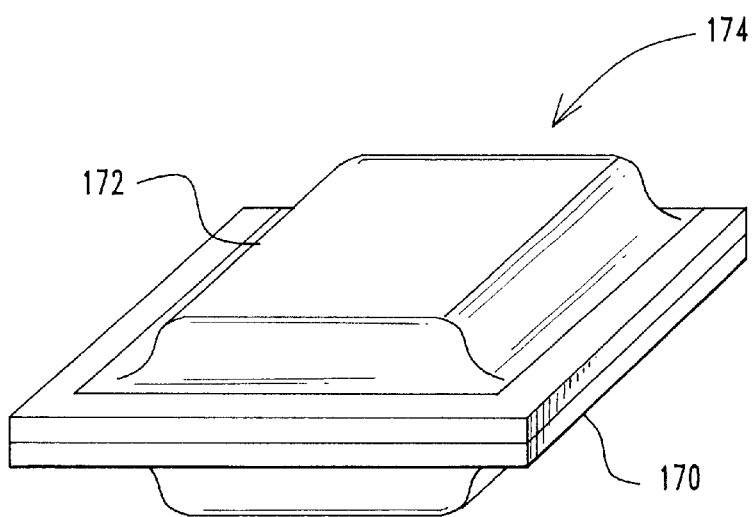
FIG. 13 is a diagrammatic perspective view of a pre-baked article produced by covering the lower sheet and filling of FIG. 12 with an upper sheet layer of baking mixture and trimming the edges of the pre-baked article for subsequent baking to form the baked article of FIG. 8.

Referring to FIGS. 12 and 13, following application of the starch/water mixture, a second baking mixture sheet 172 is placed over sheet 17 and sealed thereto, for example, by light pressure. Excess baking mixture may be trimmed away to form a pre-baked article 174. The latter may then be baked in any suitable manner including the pressure baking technique of the present invention, for instance, using mold arrangement 10 producing baked product 150 of FIG. 8 with all of its attendant advantages, as described above. Of course, application of baking layers 170 and 172 along with placing of core pockets 155 may readily be accomplished in a high speed production line environment. Subsequent baking using the pressure baking technique of the present invention will further enhance such a production line environment since baking times are significantly reduced as compared with conventional baking.

Still considering pre-baked product 174 as used to produce baked product 150 with the pressure baking technique of the present invention, the baked end product is a baked dough or batter product having characteristics controlled by the baking mixture itself. For example, bread dough, muffin batter and biscuits dough, among others, but with a core pocket in the center containing the appropriate filling. The core pocket serves to prevent leaking of the filling into a more aerated surrounding dough, in the absence of which the dough or batter will absorb the fluids in an undesirable way. Moreover, the finished product includes toaster stable crust shell 151, allowing for rapid reheating of the filling without burning the crust due to its multiple abilities to rapidly transfer heat into the filling while lending sufficient support, even in the instance of liquid fillings, and to prevent undesired escape of moisture from the filling. At the same time, the crust dries rapidly upon reheating to enhance its strength and then resists burning by efficiently conducting heat into the filling. These advantages of the enhanced thin crust are attributed to its increased density characteristics. Accordingly, filled baked product 150 can be frozen and reconstituted in a toaster by reheating in a single cycle. The filling reheats, but leaking is avoided due to its encapsulation within the encapsulation layer of the present invention.

One skilled in the art may devise many alternative configurations for the arrangements and methods disclosed herein. Therefore, it should be understood that the present invention may be embodied in many other specific forms without departing from the spirit or scope of the invention and that the present examples and methods are to be considered as illustrative and not restrictive, and the invention is not to be limited to the details given herein, but may be modified within the scope of the appended claims.

What is claimed is:

1. A method for producing a baked comestible having a baked density, said method comprising the steps of:
 a) preparing a baking mixture including at least one leavening agent provided in a predetermined amount and having a moisture content; and
 b) baking the baking mixture in a way which limits expansion of the baking mixture to establish a baked density of the baked comestible, while retaining a substantial portion of said moisture content, and such that the predetermined amount of said leavening agent is greater than a minimum amount of the leavening agent capable of producing said baked density and is sufficient to limit the time required for baking the baked comestible.

2. The method of claim 1 wherein said predetermined amount of leavening agent is substantially greater than a minimum amount of the leavening agent capable of producing said baked density.

3. The method of claim 2 wherein the predetermined amount of said leavening agent is 40% or more greater than said minimum amount of the leavening agent.

4. The method of claim 1 wherein said baking step is performed by placing the baking mixture in a mold cavity defined by an interior wall of a mold arrangement and heating the mold arrangement in a way which causes pressure and temperature in the mold cavity to rise above ambient levels so as to force a portion of the baking mixture against the interior wall of the mold arrangement to form said portion of the baking mixture into an enhanced substantially de-aerated crust which surrounds a core portion of the baked comestible and wherein the presence of said predetermined amount of leavening agent, greater than said minimum amount, contributes to the formation of the enhanced substantially de-aerated crust.

5. The method of claim 1 wherein said leavening agent includes an undesirable taste characteristic and wherein said predetermined amount of leavening agent is determined based on the leavening agent imparting said undesirable taste characteristic to the baked comestible.

6. A baked food product made in accordance with the process of claim 1.

7. In a baked food product having a baked density, the improvement comprising:

a leavening agent in a predetermined amount sufficiently uniformly distributed throughout at least a portion of the baked food product such that the predetermined amount of said leavening agent in a baking dough, having a moisture content, which is baked to form the baked food product is sufficient to limit the time required for baking the baking dough in a mold cavity defined by a mold arrangement where the mold arrangement is heated to cause pressure and temperature in the mold cavity containing the baking dough to rise above ambient levels, while retaining a substantial portion of said moisture content, and such that the predetermined amount of said leavening agent is substantially greater than a minimum amount of the leavening agent capable of producing said baked density.

8. The product of claim 7 wherein the predetermined amount of said leavening agent is 40% or more greater than said minimum amount of the leavening agent.

9. The product of claim 7 wherein said leavening agent includes an undesirable taste characteristic and wherein said predetermined amount of leavening agent is determined based on the leavening agent imparting said undesirable taste characteristic to the baked comestible.

10. The product of claim 7 wherein the mold cavity defines a baked outline and wherein the portion of said predetermined amount of leavening agent above said minimum amount contributes pressure which forces a portion of the baking dough against the interior wall of the mold arrangement to form said portion of the baking dough into an enhanced substantially de-aerated crust which surrounds a core portion of the baked food product whereby the enhanced substantially de-aerated crust is intended to substantially maintain the baked outline of the baked food product when the product is re-heated.

11. In a baked food product having a baked density and a baked outline produced using a mold arrangement having an interior wall defining a mold cavity, the improvement comprising:

a leavening agent in a predetermined amount sufficiently uniformly distributed throughout a baking mixture which forms the baked food product and having a moisture content such that the predetermined amount of said leavening agent in the baking mixture is substantially greater than a minimum amount of the leavening agent capable of producing said baked density for causing the baking mixture to fill the mold cavity while retaining a substantial portion of said moisture content and the portion of leavening agent above said minimum amount contributes pressure which forces a portion of the baking mixture against the interior wall of the mold arrangement to form said portion of the baking mixture into an enhanced substantially de-aerated crust which surrounds a core portion of the baked food product whereby the enhanced substantially de-aerated crust serves to maintain the baked outline of the baked food product when the product is re-heated.

12. A method for producing a filled baked food product using a mold arrangement having an interior surface defining a mold cavity, said method comprising the steps of:

a) preparing a baking mixture including at least one leavening agent provided in a predetermined amount;

b) preparing a core pocket which is made up of a filling surrounded by an encapsulant layer which encapsulant layer is intended to substantially prevent penetration of the filling into the encapsulant layer and to substantially prevent escape of the filling sealed therein;

c) covering the core pocket with an outer layer of a baking mixture having particular baked eating characteristics to form a pre-baked product such that said outer layer of baking mixture surrounds said encapsulant layer;

d) sealing the pre-baked product in said mold cavity to limit expansion of the pre-baked product and to establish a baked outline; and e) heating the mold arrangement such that pressure and temperature in the mold cavity rise sufficiently to bake the pre-baked product in a way which establishes a baked density of the outer layer and the predetermined amount of said leavening agent is sufficient to limit the time required for baking the baked comestible and to contribute to pressure build-up in the mold cavity which causes a portion of the outer layer to be forced against said interior surface to form a portion of said outer layer into an enhanced substantially de-aerated crust while said encapsulant layer serves to maintain separation between the filling and said outer layer to preserve the baked eating characteristics of said outer layer and so that the enhanced substantially de-aerated crust serves to maintain the baked outline of the baked food product, even when re-heated from an unfrozen state, and the core pocket serves to maintain separation of the filling and the outer layer at least to a limited extent, even when re-heated from an unfrozen state.

13. A method for producing a baked comestible, said method comprising the steps of:

a) preparing a baking mixture including at least one leavening agent provided in a predetermined amount; and b) baking the baking mixture in a way which limits expansion of the baking mixture in a mold cavity having a cavity volume such that the predetermined amount of said leavening agent is greater than a standard amount of the leavening agent which would increase a baked good volume of the baked comestible beyond a desired volume when expansion is unconstrained.

14. The method of claim 13 wherein said predetermined amount of leavening agent is approximately 50% to 200% greater than said standard amount.

* * * * *